(12) United States Patent
Hara et al.

(10) Patent No.: US 6,969,565 B2
(45) Date of Patent: Nov. 29, 2005

(54) SOLID OXIDE FUEL CELL STACK AND METHOD OF MANUFACTURING THE SAME

(75) Inventors: Naoki Hara, Kanagawa-ken (JP);
Keiko Kushibiki, Kanagawa-ken (JP);
Fuminori Sato, Kanagawa-ken (JP);
Mitsugu Yamanaka, Kanagawa-ken (JP); Makoto Uchiyama, Kanagawa-ken (JP); Masaharu Hatano, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 347 days.

(21) Appl. No.: 10/182,051

(22) PCT Filed: Nov. 22, 2001

(86) PCT No.: PCT/JP01/10233

§ 371 (c)(1),
(2), (4) Date: Jul. 25, 2002

(87) PCT Pub. No.: WO02/45198

PCT Pub. Date: Jun. 6, 2002

(65) Prior Publication Data

US 2003/0012995 A1    Jan. 16, 2003

(30) Foreign Application Priority Data

Nov. 28, 2000   (JP) .............................. 2000-360563

(51) Int. Cl.[7] .......................... H01M 4/86; H01M 4/88; H01M 2/18; H01M 8/24
(52) U.S. Cl. ............................ 429/44; 429/30; 429/32; 429/34; 429/40
(58) Field of Search .............................. 429/30, 32–34, 429/40, 41, 44

(56) References Cited

U.S. PATENT DOCUMENTS 5,789,093 A  *  8/1998  Malhi .......................... 429/34

(Continued)

FOREIGN PATENT DOCUMENTS

DE          19757320      *  7/1999   .......... H01M 4/92

(Continued)

OTHER PUBLICATIONS

Piotto M et al.: "Technology of integrable free-standing yttria-stabilized zirconia membranes" Thin Solid Films, Elsevier-Sequoia S.A. Lausanne, CH, vol. 346, No. 1-2, Jun. 1, 1999, pp. 251-254, XP004177689.

(Continued)

*Primary Examiner*—Tracy Dove
(74) *Attorney, Agent, or Firm*—McDermott Will & Emery LLP

(57) ABSTRACT

A solid oxide fuel cell stack in which first and second cell plates are alternately stacked. The first cell plates comprises a substrate having a plurality of opening portions, a groove which extends through the plurality of opening portions formed on a lower surface of the substrate, a solid electrolyte layer which covers the opening portion formed on an upper surface of the substrate, a fuel electrode layer which covers the opening portions formed on the solid electrolyte layer, and an air electrode layer formed on the lower surface of the substrate so as to extend along the opening portions and the groove. The second cell plates has a structure in which the air electrode layer is replaced with the fuel electrode layer in the first cell plate. In this fuel cell stack, the air electrode layer of the first cell plate faces the air electrode layer of the second cell plate, and the fuel electrode layer of the first cell plate faces the fuel electrode layer of the second cell plate. A method of manufacturing the solid oxide fuel cell stack comprises preparing the first cell plate, preparing the second cell plate, alternately stacking the first and second cell plates, and collectively sintering the stacked first and second cell plates.

18 Claims, 9 Drawing Sheets

U.S. PATENT DOCUMENTS

| | | | |
|---|---|---|---|
| 5,942,349 A | | 8/1999 | Badwal et al. |
| 6,641,948 B1 * | | 11/2003 | Ohlsen et al. ............... 429/44 |
| 6,677,070 B2 * | | 1/2004 | Kearl ........................... 429/33 |
| 2003/0012994 A1 * | | 1/2003 | Kushibiki et al. ............ 429/30 |

FOREIGN PATENT DOCUMENTS

| | | | | |
|---|---|---|---|---|
| JP | 9-45355 | | 2/1997 | |
| JP | 09-045355 | * | 2/1997 | ........... H01M 8/24 |
| JP | 09045355 | | 2/1997 | |
| WO | WO00/45457 | | 8/2000 | |

OTHER PUBLICATIONS

Morse J D et al.: "A Novel Thin Film Solid Oxide Fuel Cell for Microscale Energy Conversion" Proceeding of the SPIE, SPIE, Bellingham, VA, US, vol. 3876, Sep. 20, 1999, Pates 223-226, XP001023875.

Lee J S et al.: "Fabrication of a micro catalytic gas sensor using thin film process and Si anisotropic etching techniques" Sensors and Actuators B, Elsevier Sequoia S.A., Lausanne, CH, vol. 45, no. 3, Dec. 15, 1997, pp. 265-269, XP004119173.

G. Schiller et al., "Plasma Sprayed Thin-Film SOFC for Reduced Operating Temperature", no date.

Alan F. Jankowski et al., "Thin Film Synthesis of Novel Electrode Materials for Solid-Oxide Fuel Cells", Mat. Res. Soc. Symp. Proc. vol. 496, 1998, pp. 155-158.

P. Batfalsky et al., "Operation and Analysis of Planar SOFC Stacks", pp. 349-352, no date.

Deutsches Zentrum fur Luft- und Raumfahrt (DLR), Institut fur Technische Thermodynamik, pp. 597-600, no date.

G. Schiller et al., "Plasama Sprayed Thin-Film SOFC for Reduced Operating Temperature", no date.

Alan F. Jankowski et al., "Thin Film Synthesis of Novel Electrode Materials for Solid-Oxide Fuel Cells", Mat. Res. Soc. Symp. Proc. Vol. 496, 1998, pp. 155-158.

P. Batfalsky et al., "Operation and Analysis of Planar SOFC Stacks", pp. 349-352, no date.

* cited by examiner

PRIOR ART

A-A'

B-B'

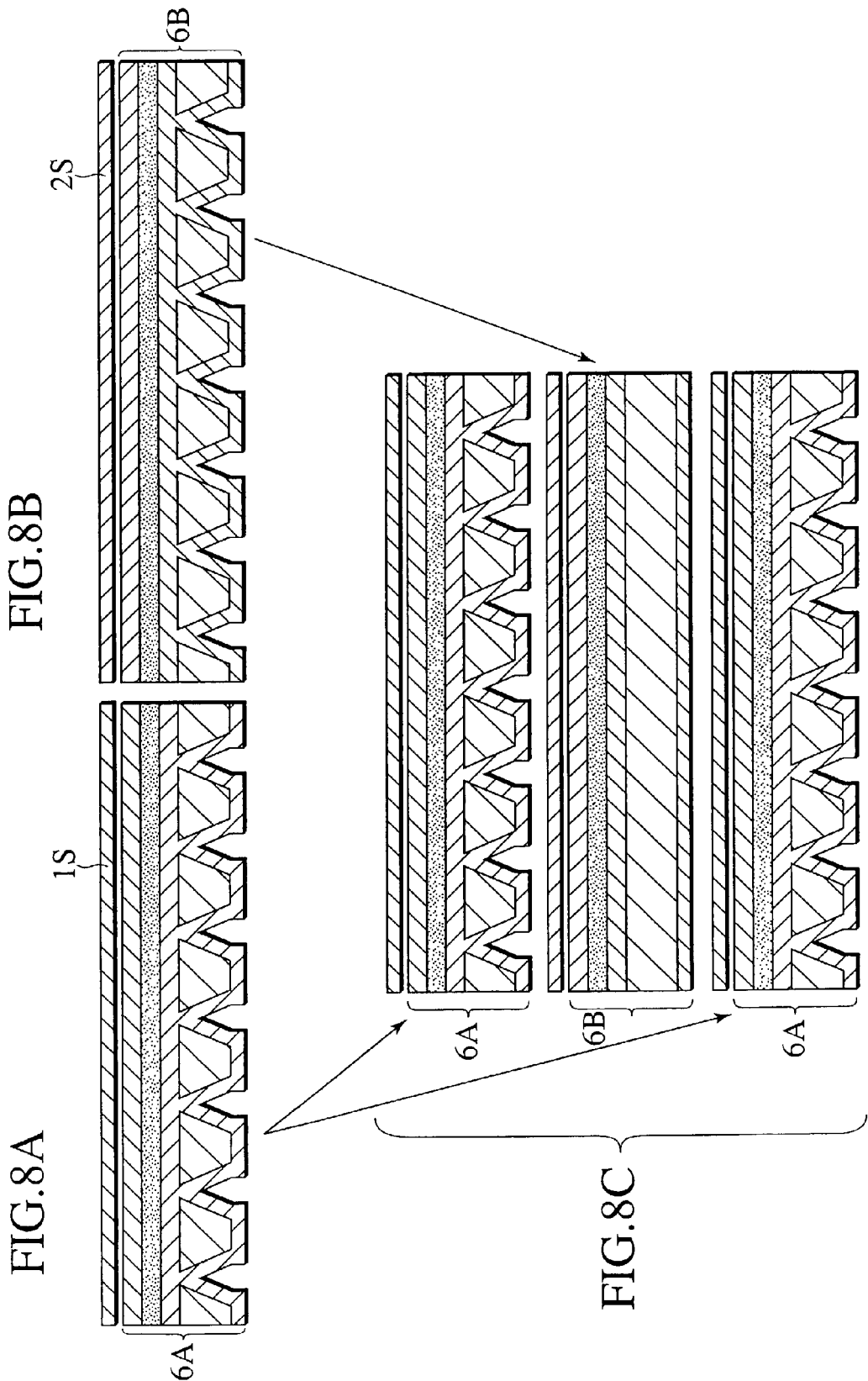

SOLID OXIDE FUEL CELL STACK AND METHOD OF MANUFACTURING THE SAME

TECHNICAL FIELD

The present invention relates to a stack used for a solid oxide fuel cell and a method of manufacturing the same, more specifically to a stack for use in a solid oxide fuel cell capable of being made to be small and thin without using a separator or an interconnect with high reliability, a method of manufacturing the same and a solid oxide fuel cell.

BACKGROUND ART

A fuel cell is composed of a solid electrolyte showing ion conductivity such as oxygen ion and proton, a porous air electrode (oxidation electrode: cathode) on one side surface of the solid electrolyte and a fuel electrode (reduction electrode: anode) on the other side surface of the solid electrolyte. Oxidation gas containing oxygen gas is supplied to the air electrode, and reduction gas containing hydrogen and hydrocarbon gas is supplied to the fuel electrode. These gases electrochemically react with each other through the solid electrolyte, thus generating electromotive force.

However, the electromotive force obtained by a fuel cell unit is as small as about 1.12 V, and a plurality of cells must be connected in series to obtain sufficient electromotive force for using them as a household power source or a power source for a car.

A solid oxide fuel cell (hereinafter referred to as SOFC) is one kind of fuel cells. The SOFC are divided broadly two categories. One is a cylindrical type in which electrodes and a solid electrolyte are covered around a cylinder and the other is a planar type in which a solid electrolyte and electrodes are formed to be planar.

The cylindrical type SOFC combined with the cylindrical cells shows difficulty in enlarging an area of a power generation portion (an area of a solid electrolyte) of the cell. Further a power density per unit volume is low when the cells are connected. Accordingly, how to increase the power density thereof has been a fundamental technical subject. On the other hand, the planar SOFC combined with the planar cells (cell plates) has an advantageous structure in increasing a power density per unit volume of a cell, and which is suitable for a power source of a moving body.

As the planar SOFC, as shown in FIGS. 1 and 2, the one has been known, which has a structure that cell plates 10A and 10B are stacked so that fuel electrodes 13 face to each other with interconnects 14b therebetween and air electrodes 12 face to each other with interconnects 14a therebetween (Japanese Patent Laid-Open publication H9-45355 (published in 1997)).

As shown in FIG. 2, this planar SOFC is composed of the cell plates 10A and 10B, each of which has planar solid electrolyte 11. Each of the cell plates 10A and 10B has the planar solid electrolyte 11 of a predetermined thickness, the porous air electrode 12 formed on one side surface of the solid electrolyte 11, and the porous fuel electrode 13 formed on the other side surface thereof. In this SOFC, to secure rigidity of the cell plate, one of the air electrode 12 and the fuel electrode 13 is formed to be thicker than other portions.

As shown in FIG. 1, the cell plates 10A and 10B adjacent to each other have vertically adverse arrangements as to the air electrode 12 and the fuel electrode 13. Specifically, as shown in FIG. 2, the uppermost cell plate 10A is arranged so that the air electrode 12 is allowed to face upward and the fuel electrode 13 is allowed to face downward. The second uppermost cell plate 10B is arranged so that the fuel electrode 12 is allowed to face upward and the air electrode 13 is allowed to face downward. Other cell plates are arranged in the same manner as the above. Consequently, the air electrodes 12 and the fuel electrodes 13 of the adjacent cell plates are allowed to face each other, respectively.

The conductive interconnect 14a for an electrical collection lead is interposed between the electrodes 12 and 12 which face each other as described above, and the conductive interconnect 14b for an electrical collection lead is interposed between the electrodes 13 and 13 which face each other as described above. Moreover, the interconnects 14a and 14b form gas flow paths, respectively. The interconnect 14a electrically connects the electrodes 12 and 12, and the interconnect 14b electrically connects the electrodes 13 and 13.

In this SOFC, a separator is unnecessary by adopting the above-described constitution. The problems of lowering of the electromotive force due to internal resistance of the separator and scaling-up of the fuel cell are solved.

DISCLOSURE OF INVENTION

To secure strength of the fuel cell as a structural body, the air electrode (or the fuel electrode) must be formed to be thick in the SOFC shown in FIG. 2. Therefore, a problem of improvement in a series resistance component within the fuel cell still remains. Moreover, since the interconnect that is a rectangular body, which serves also as a partition wall of the gas flow path, is located on the electrode, it is impossible to form the interconnect itself in a form of a thin film, and a problem of improvement in a series resistance component still remains, too.

Further, since the planar solid electrolyte is used as a base member (supporting member), the solid electrolyte layer needs to have a sufficient thickness, so that resistance of the electrolyte layer becomes high. Therefore, it is impossible to increase electromotive force of the fuel cell.

Furthermore, since an operation temperature needs to be elevated in order to decrease the resistance of the electrolyte and to lower the series resistance component of the fuel cell, material durable to high temperature must be used as the ones constituting the fuel cell. To operate the fuel cell at a high operation temperature causes a problem in costs of materials and reliability on the operation.

To solve these problems, an object of the present invention is to provide a planar fuel cell stack which shows low series resistance, and is small-sized with high reliability.

Another object of the present invention is to provide a method of manufacturing the above-described fuel cell stack.

A solid oxide fuel cell stack according to a first aspect of the present invention comprises first and second cell plates, which are alternately stacked one another. The first cell plate includes a substrate having a plurality of opening portions, a groove which extends through the plurality of opening portions formed in a lower surface of the substrate, a solid electrolyte layer which covers the opening portions formed on an upper surface of the substrate, a fuel electrode layer which covers the opening portions formed on the solid electrolyte layer, and an air electrode layer which extend along each opening portion and each groove formed on the lower surface of the substrate. The second cell plate includes a substrate having a plurality of opening portions, a groove which extends through the plurality of opening portions formed in a lower surface of the substrate, a solid electrolyte layer which covers the opening portions formed on an upper surface of the substrate, an air electrode layer formed on the solid electrolyte layer, and a fuel electrode layer extends along the openings and the groove formed on a lower surface of the substrate. In the fuel cell stack, the air electrode layer of the first cell plate faces the air electrode layer of the second cell plate, and the fuel electrode layer of the first cell plate faces the fuel electrode layer of the second cell plate.

A method of manufacturing a solid oxide fuel cell stack according to a second aspect of the present invention includes preparing the first cell plate, preparing the second cell plate; alternately stacking the first and second cell plates upon another, and baking the stacked first and second cell plates collectively.

According to the solid oxide fuel cell stack of the first aspect of the present invention and the method of manufacturing the same of the second aspect of the present invention, the air electrode layer formed on the lower surface of the substrate of the first cell plate is formed along the opening portions and the groove. On the other hand, the air electrode layer of the second cell plate facing the air electrode layer of the first cell plate has a plane shape. Accordingly, an air flow path is formed by these two air electrode layers.

Similarly, a fuel gas flow path is formed by the fuel electrode layer formed on the lower surface of the substrate of the second cell plate, the fuel electrode layer being formed along the opening portions and the groove, and by the plane-shaped fuel electrode layer of the first cell plate facing the fuel electrode layer.

Accordingly, the gas flow path does not need to be formed by an interconnect and a separator, and the fuel cell stack can be constituted only by the cell plates. Thus, the fuel cell stack can be miniaturized. Moreover, since junction surfaces of the first and second cell plates are formed of the same material and the first and second cell plates are jointed with each other in these junction surfaces, occurrence of cracks in a junction portion of the first and second cell plates owing to a difference of a thermal expansion coefficient between them can be prevented.

The air flow path is surrounded only by the air electrode layers showing high resistance to high temperature oxidation atmosphere and the fuel gas path is surrounded only by the fuel electrode layers showing high temperature reduction atmosphere. Thus, the fuel cell stack can enhance its resistance to corrosion.

Moreover, the interconnect and the separator are unnecessary, and the fuel cell composed of the thin film solid electrolyte layer, the fuel electrode layer and the air electrode layer can be formed in the opening portion of the substrate in each cell plate. Accordingly, a series resistance of the stack can be reduced.

BRIEF DESCRIPTION OF DRAWINGS

FIGS. 8A to 8C are sectional views in steps showing a method of manufacturing the fuel cell in the embodiment according to the present invention.

BEST MODE CARRYING OUT THE INVENTION

A fuel cell stack according to an embodiment of the present invention and a cell plate composing the same will be described in detail below.

In this specification, for the sake of convenience for explanations, one main surface (a surface other than side surfaces) of a substrate, an electrode layer and a solid electrolyte layer is described as an "upper surface" or a "front surface", and the other main surface thereof is described as a "lower surface" or a "back surface". A stack in which cell plates are stacked in the vertical direction and a stack in which cell plates are stacked in the horizontal direction or the like are included in the scope of the present invention. Moreover, in a "fuel electrode layer" and an "air electrode layer", two electrode layers having different polarities are formed in one cell plate, and a constitution in which two electrode layers are replaced by one another is also included in the scope of the present invention.

Furthermore, in this specification, "%" represents a percentage by mass unless otherwise specifically mentioned.

Figure 1:
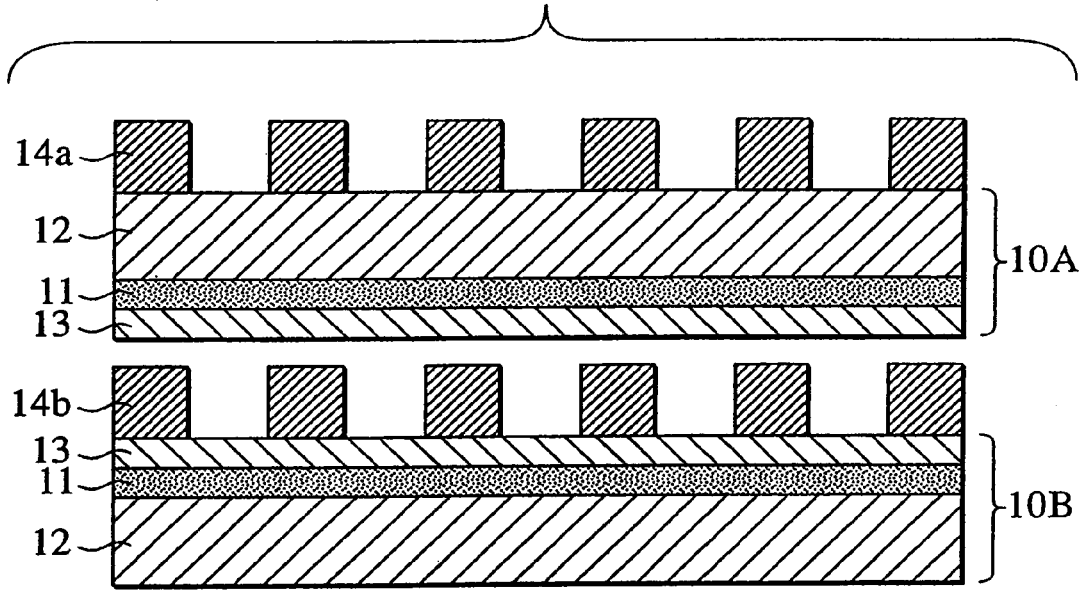
FIG. 1 is a sectional view showing an example of a conventional fuel cell stack using an interconnect.
Figure 2:
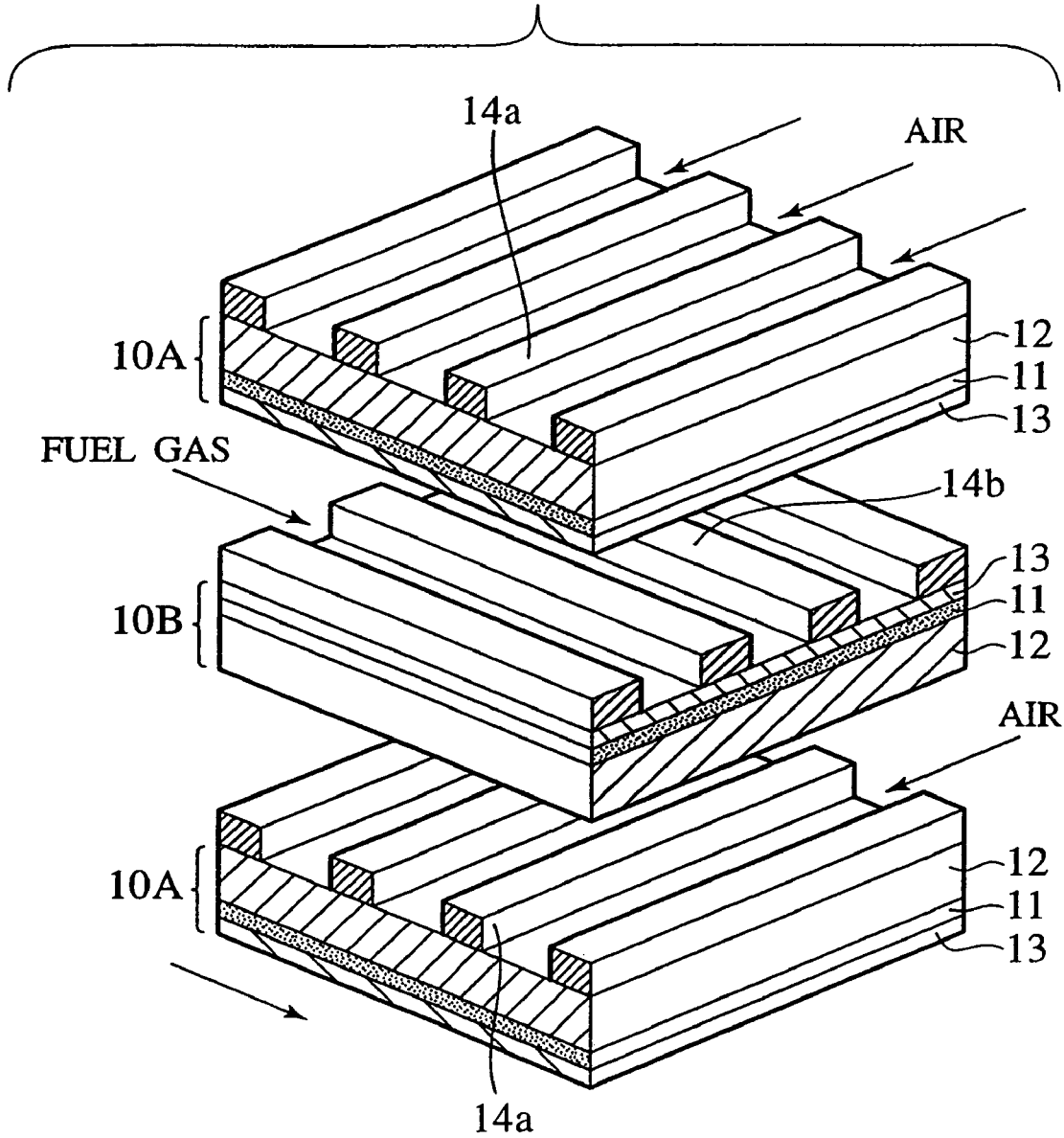
FIG. 2 is a perspective view showing the conventional fuel cell stack using the interconnect.
Figure 3:
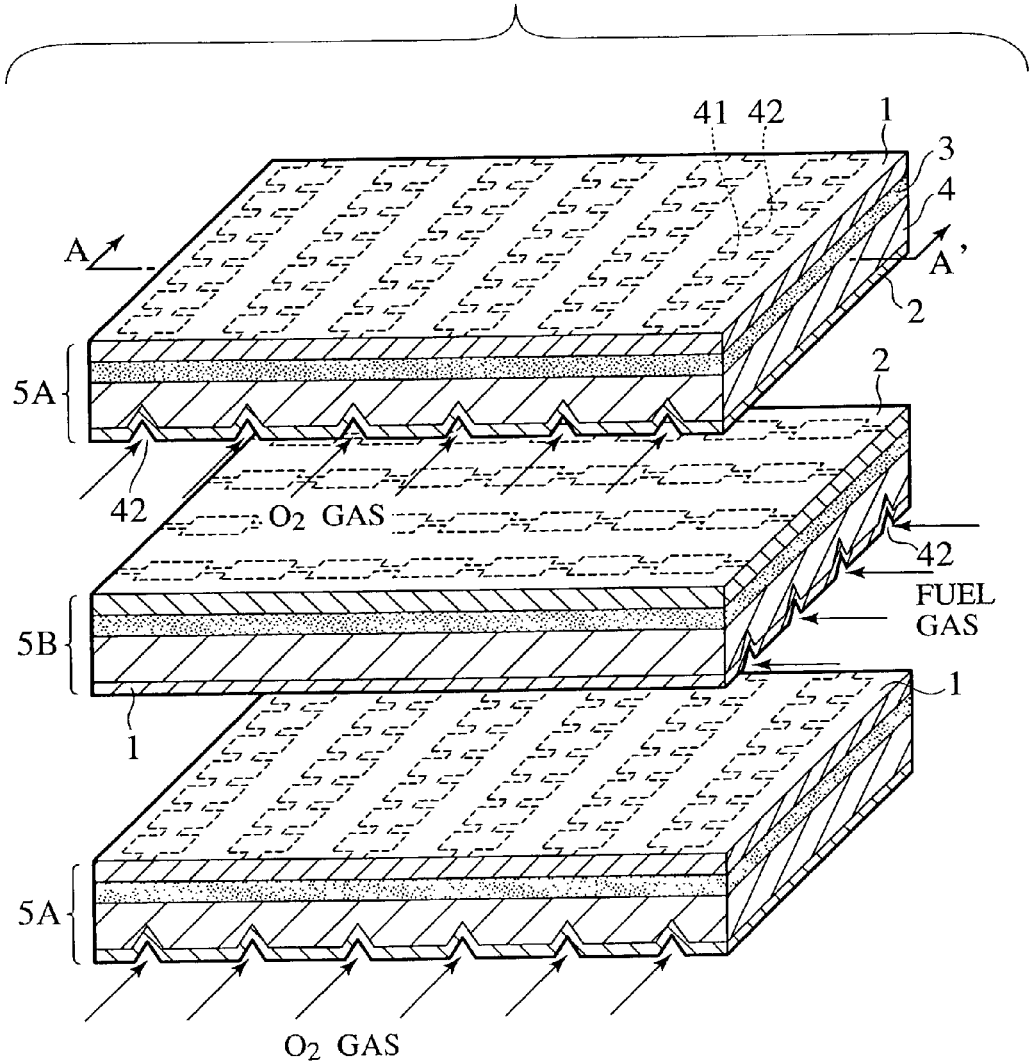
FIG. 3 is a perspective view showing a structure of a fuel cell stack of an embodiment according to the present invention.
Figure 4:
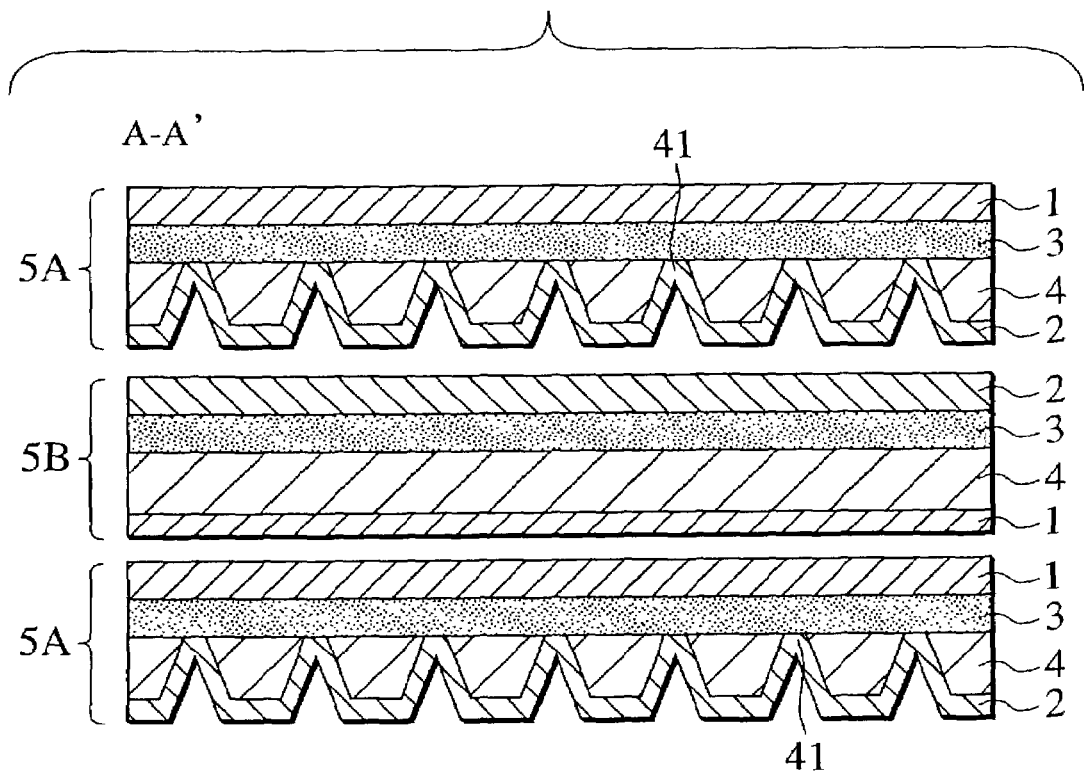
FIG. 4 is a sectional view showing the structure of the fuel cell stack of the embodiment according to the present invention.

FIG. 3 is an exploded perspective view of a stack of an embodiment according to the present invention. FIG. 4 is a sectional view of a cell plate constituting the stack taken along the line A–A' in FIG. 3. In the drawings, the cell plate 5A shows an example of a first cell plate of the present invention, and the cell plate 5B shows an example of a second cell plate thereof.

First, a structure of the cell plate will be described. As shown in FIG. 4, the cell plate 5A has a structure that the air electrode layer 2, the substrate 4, the solid electrolyte layer 3 and the fuel electrode layer 1 are stacked upward in this order. On the other hand, the cell plate 5B has a structure that the fuel electrode layer 1, the substrate 4, the solid electrolyte layer 3 and the air electrode layer 2 are stacked upward in this order. Note that in the cell plates 5A and 5B, the corresponding layers and the corresponding substrates are made of the same materials.

The substrate 4 is formed of a flat and compact material such as a Si substrate, and has a plurality of opening portions 41 and a plurality of grooves 42. As shown in FIG. 3, the grooves 42 extend through the plurality of opening portions 41 arranged in line.

As shown in FIG. 4, the solid electrolyte layer 3 and the fuel electrode layer 1 are layered on the upper surface of the substrate 4 of the cell plate 5A, and each opening portion 41 of the substrate is covered with these layers. Moreover, on the lower surface side of the substrate 4, the air electrode layer 2 is formed along the bottom surfaces of each opening portion 41 and the groove. This air electrode layer 2 contacts the solid electrolyte layer 3 at each opening portion 41 of the substrate. Accordingly, in this case, each opening portion 41 of the substrate 4 works as a power generation area.

The cell plate 5B has a structure that the fuel electrode layer 1 of the cell plate 5A and the air electrode layer 2 thereof are replaced by one another.

Figure 5A:
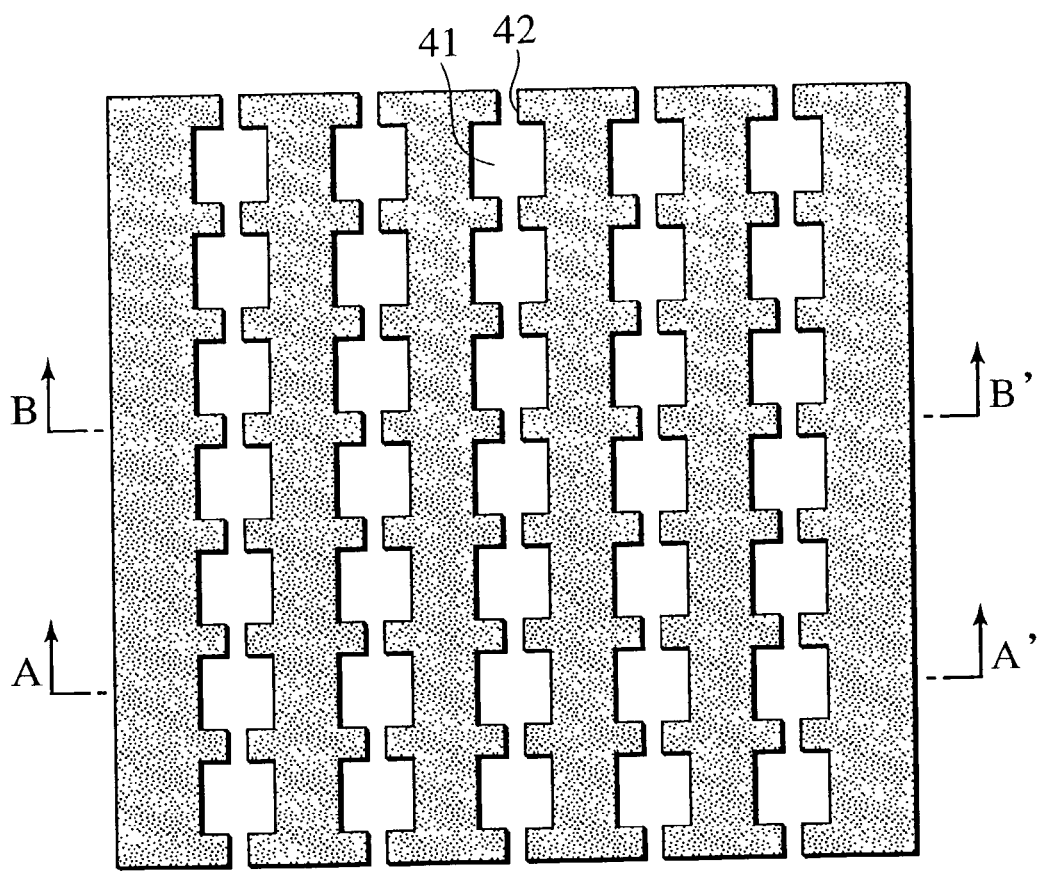
FIG. 5A is a bottom view of a substrate having grooves and opening portions, which is used for the fuel cell stack of the embodiment according to the present invention.
Figure 5B:
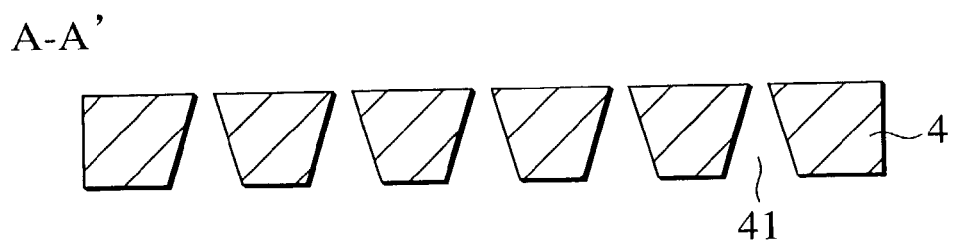
FIG. 5B is a sectional view of the substrate taken along the line A–A' (opening portions).
Figure 5C:
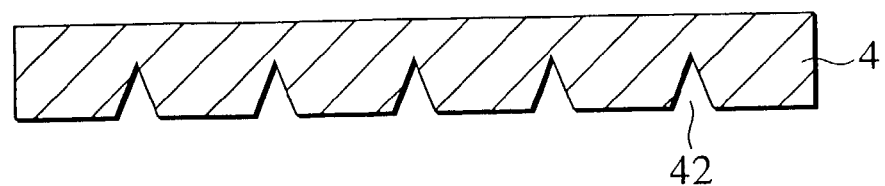
FIG. 5C is a sectional view of the substrate taken along the line B–B' (groove portions).

FIG. 5A is a bottom view of the substrate 4, and FIGS. 5B and 5C are sectional views taken along the lines A–A' and B–B' in FIG. 5A, respectively. As shown in FIG. 5A, in the substrate 4, the grooves 42 as well as the opening portions 41 are formed on the lower surface of the substrate 4. These grooves 42 are formed so as to extend through the opening portions 41 arranged in line.

In the substrate shown in FIG. 5A, though each groove 42 extends through from one end side of the substrate 4 to the other end side thereof, the groove 42 does not necessarily need to extend through them. For example, when the plurality of substrates are stacked, a structure may be adopted, in which a gas introduction path extending through the plurality of substrates in their thickness direction is provided, and the gas introduction path is communicated with each groove 42.

As shown in FIGS. 3 and 4, in the cell plate 5A, since the air electrode layer 2 is formed along the bottom surface of the opening portion 41 and the surface of the groove 42, the air electrode layer 2 has a shape (hereinafter referred to as an opening shape with a groove) in conformity with the shapes of the groove and the opening portion. The fuel electrode layer 1 formed on the solid electrolyte layer 3 has a plane shape.

On the other hand, the cell plate 5B has a structure that in the cell plate 5A, the air electrode layer 2 and the fuel electrode layer 1 are replaced by one another. In the cell plate 5B, the fuel electrode layer 1 is formed along the bottom surfaces of the opening portion 41 and the groove 42. Accordingly, the fuel electrode layer 1 has the opening shape with a groove, and the air electrode layer 2 has a plane shape.

The fuel cell stack of the embodiment according to the present invention has a structure that the cell plate 5A and the cell plate 5B are alternately stacked upon one another. According to the composition of this stack, as shown in FIGS. 3 and 4, the air electrode layer 2 having a opening shape with a groove, which is formed on the lower surface of the cell plate 5A arranged above the cell plate 5B, and the air electrode layer 2 having a plane shape, which is formed on the upper surface of the cell plate 5B, are jointed to each other, thus forming air flow paths. The fuel electrode layer 1 having the opening shape with a groove, which forms the lower surface of the cell plate 5B, and the plane-shaped fuel electrode layer 1 of the cell plate 5A located below the cell plate 5B are jointed to each other, thus forming fuel gas paths. Since the air flow path and the fuel gas flow path can be secured without using an interconnect and a separator, no increase in a series resistance owing to existence of the interconnect and the separator exists, and the fuel cell stack can be miniaturized as well.

Since the fuel flow path and the air flow path are made of the same material respectively in the stack of this embodiment, fuel gas and the air flow in the flow paths formed so as to be surrounded by only the same fuel electrode material and air electrode material. The air electrode material has extremely high resistance to a high temperature oxidation environment, and the fuel electrode material has extremely high resistance to a high temperature reduction reaction. Accordingly, the gas flow path of this embodiment shows a higher chemical stability than a gas flow path using an interconnect and the like, and can avoid an increase in resistance between the electrodes due to influences of gas.

Noted that a so-called cross-flow style should be desirably adopted in which an extending direction of the groove 42 of the cell plate 5A and an extending direction of the groove 42 of the cell plate 5B are made to be intersected each other thus intersecting the air flow path and the fuel path. Such arrangements of the cell plates enhance strength of the whole of the stack.

Furthermore, since the cell plates 5A and 5B are stacked in the above described manner, the cell plates 5A and 5B are contacted or jointed to each other in their portions formed of the same material. Particularly, when the cell plates 5A and 5B are jointed to each other, problems such as cracks due to thermal stress in the junction portion between the cell plates can be avoided.

In the stack of this embodiment, it is satisfactory that the electrode layers formed of the same material are stacked so as to contact with each other as described above. Such electrode layers are jointed in consideration for handling performance. A method of jointing the cell plates is not particularly limited. Slurry containing the same material as the constituent materials of the electrode layers to be jointed is coated between the electrode layers to be jointed and sintered, thus jointing them. Thus, it is possible to effectively avoiding the problem such as cracks due to thermal stress.

In the cell plate of this embodiment, a silicon substrate and the like can be used as the substrate. Accordingly, semiconductor processes can be used for manufacturing the cell plate. The solid electrolyte layer and the electrode layer can be formed in the form of a thin film by use of a PVD (physical vapor deposition) method, a CVD (chemical vapor deposition) method, or a metal printing method (screen printing, splay coating), which have been broadly used in semiconductor processes. Specifically, since each layer can be formed to a thickness of several hundred nm to several ten $\mu$m, miniturization of the fuel cell can be achieved, and a series resistance component of the obtained fuel cell can be significantly reduced, thus increasing electromotive force (output density).

As the PVD method, a vacuum deposition method, a sputtering method, an ion plating method and the like can be enumerated. As the CVD method, a thermal CVD method, a plasma CVD method and the like can be enumerated.

Figure 6:
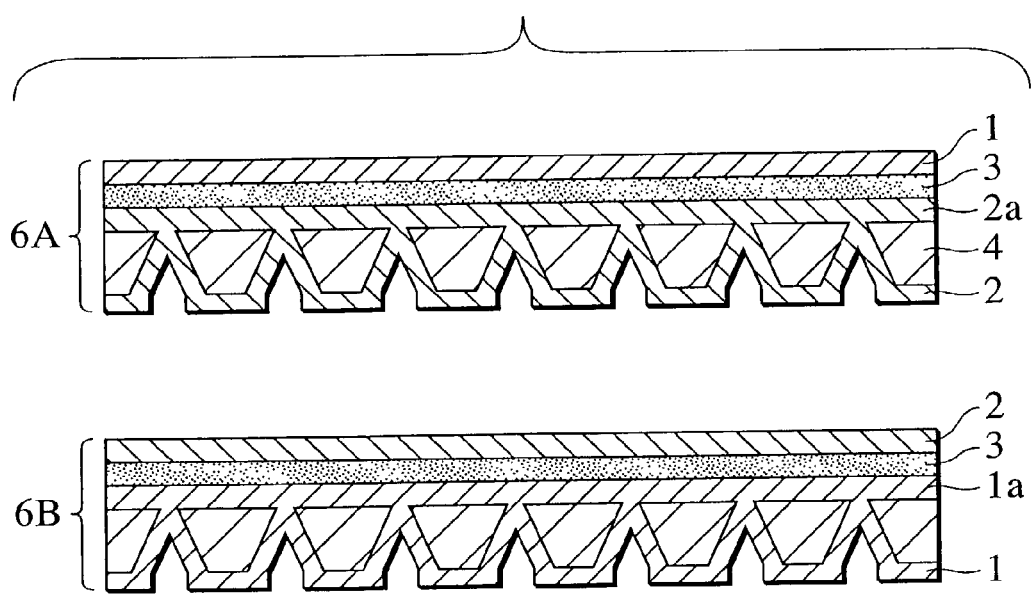
FIG. 6 is a sectional view of a cell plate 6A used for the fuel cell stack of the embodiment according to the present invention and another cell plate 6B used for the same.

FIG. 6 shows an example of another cell plate of this embodiment. As shown in FIG. 6, the cell plate 6A may further have another air electrode layer 2a between the substrate 4 and the solid electrolyte layer 3. Similarly, the cell plate 6B may further have another fuel electrode layer 1a between the substrate 4 and the solid electrolyte layer 3.

Moreover, as long as an electrical contact is not disturbed, the cell plate of this embodiment may have an insulating layer formed of silicon, silicon nitride, or the like which is formed between the substrate 4 and the solid electrolyte layer 3 at least on the whole upper layer of the substrate 4 or a part of the upper layer of the substrate 4.

Furthermore, the cell plate of this embodiment may have a stress absorbing layer between the substrate 4 and the solid electrolyte layer 3 at least on the whole upper layer of the substrate 4 or a part of the upper layer of the substrate 4. The stress absorbing layer reduces a stress caused by difference of thermal expansion coefficients between the substrate 4 and the solid electrolyte layer 3. The stress absorbing layer may be made of an insulative material. Alternately, the stress absorbing layer may be made of an electrode material or a solid electrolyte material. Resistance to damage against thermal stress can be further enhanced by the stress absorbing layer, and reliability of the cell can be improved as well.

Next, a method of manufacturing the cell plate of this embodiment will be described.

Figure 7A:
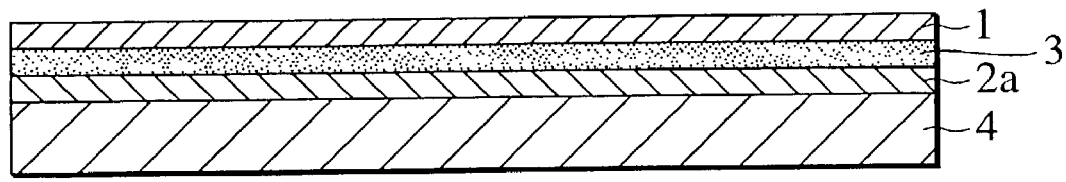
FIGS. 7A to 7C are sectional views in steps showing a method of manufacturing the cell plate 6A in the embodiment according to the present invention.
Figure 7B:
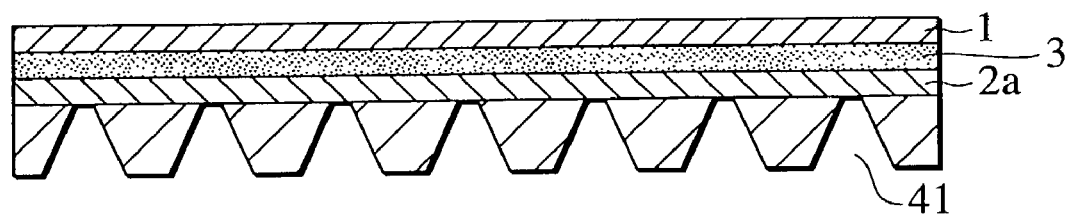
Figure 7C:
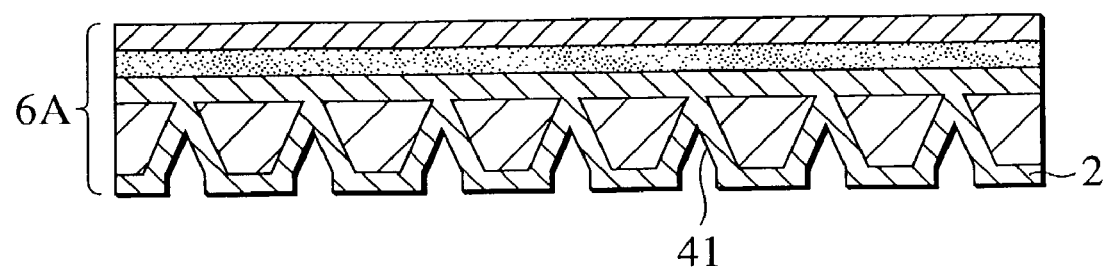

An example of a method of manufacturing the cell plate of this embodiment is shown in FIGS. 7A to 7C. Noted that herein a method of manufacturing the cell plate 6A shown in FIG. 6 is described.

As shown in FIG. 7A, the air electrode layer 2a, for example, strontium doped lantern/manganese composite oxide (LSM), the solid electrolyte layer 3, for example, yttria doped stabilization zirconia (YSZ), and the fuel electrode layer 1, for example, nickel oxide, are sequentially formed on the upper surface of the substrate 4 (for example, single-crystal silicon substrate) by a physical vapor deposition method such as a sputtering method and an ion plating method, a chemical vapor deposition method such as a plasma CVD method, or a liquid phase deposition method such as plating, to form a layered composed of the air electrode layer 2a, the solid electrolyte layer 3 and the fuel electrode layer 1. The substrate 4 may be made of materials, which shows an electrical conductivity at the temperature when the call can operate.

Next, as shown in FIG. 7B, the plurality of opening portions 41 and the plurality of grooves 42 (not shown) are formed in the substrate 4 by chemical processing such as etching, electric discharge processing or mechanical processing. In this step, the bottom surface of the air electrode layer 2a is exposed to the opening portions 41.

Thereafter, as shown in FIG. 7C, by the foregoing physical vapor deposition method, the chemical vapor deposition method or the liquid phase deposition method, the air electrode layer 2a, for example, strontium doped lantern/manganese composite oxide is formed on the lower surface of the substrate 4 in which the opening portions 41 and the grooves 42 are formed. The air electrode layer 2 is formed along the grooves 42 and the opening portions 41 to have an opening shape with a groove. Moreover, in each of the opening portions 41, a layered structure is formed, which is composed of the air electrode layer 2, the air electrode layer 2a, the solid electrolyte layer 3 and the fuel electrode layer 1, forming them upward in this order. Thus, one cell plate 6A is formed.

Noted that the cell plate 6B composed of different layered order from that of the cell plate 6A can be manufactured by replacing the position of the air electrode layer with that of the fuel electrode layer in the foregoing treatment.

Next, a method of manufacturing the solid oxide fuel cell stack will be described.

The cell plates 6A and 6B obtained by the foregoing method are prepared in plural number. As shown in FIGS. 8A and 8B, slurry is coated on the flat uppermost electrode layer of each cell plate. The slurry contains the same material as that of this flat uppermost electrode layer. Specifically, the fuel electrode slurry 1s is coated onto the fuel electrode layer 1 of the cell plate 6A, and the air electrode slurry 2s is coated onto the air electrode layer 2 of the cell plate 6B.

Thereafter, as shown in FIG. 8C, the cell plates 6A and 6B, onto which the slurries are coated, are alternately stacked. Specifically, the cell plates 6A and 6B are stacked so that the air electrode layer 2 having the opening shape with a groove and the flat air electrode layer 2 are opposite to each other and the fuel electrode layer 1 having the opening shape with a groove and the flat fuel electrode layer 1 are opposite to each other. Noted that the cell plates are arranged so that the air flow path and the fuel gas path cross.

The number of the cell plates to be stacked is not particularly limited. A combination of the two cell plates 6A and the one cell plate 6B or a combination of the one cell plate 6A and the two cell plates 6B are treated as the minimum unit. The number of the cell plates to be stacked can be increased in response to a desired voltage.

The slurry in the electrode contact portions of the cell plates 6A and 6B is sintered, thus jointing the air electrode layers opposite to each other and the fuel electrode layers opposite to each other. The air flow path is formed between the cell plates 6A and 6B by the air electrode layer 2 having the opening shape with a groove and the flat air electrode layer 2, and the fuel gas flow path is formed between the cell plates 6A and 6B by the fuel electrode layer 1 having the opening shape with a groove and the flat fuel electrode layer 1.

In the method of manufacturing the fuel cell stack of this embodiment, as described above, the electrode layer and the solid electrolyte layer of the cell plate are not coated onto the cell plate in stacking the layers, but they are previously coated onto the cell plate by the foregoing physical vapor deposition method, the foregoing chemical vapor deposition method or the foregoing liquid phase deposition method such as an electroless plating method.

EXAMPLES

An embodiment of the present invention will be described below.

1) Treatment of Substrate

As the substrate, a (100) orientation single-crystal silicon substrate having a diameter of 5 inches and a thickness of 0.65 mm, one surface of which was mirror-polished, was used as the substrate. Antimony was previously doped to this substrate, and its resistively was 10 to 11 Ω cm. The substrate was cut to a square shape of 5 cm square by a dicing saw so that each side thereof is made to be (110) oriented. The substrate which was processed to a square shape was subjected to a dipping treatment for 10 minutes in a mixed solution of water:hydrogen peroxide:ammonium hydroxide=5:1:0.05, which was kept at 90° C. Thereafter, the substrate was dipped in 5% hydrofluoric acid aqueous solution for one minute and then dipped in pure water for one minute. Then, the substrate was taken out therefrom, followed by drying the substrate by ejecting nitrogen gas thereto. Immediately after drying the substrate, the substrate was transported within a sputtering apparatus with plural targets according to ultrahigh vacuum spec.

Figure 9:
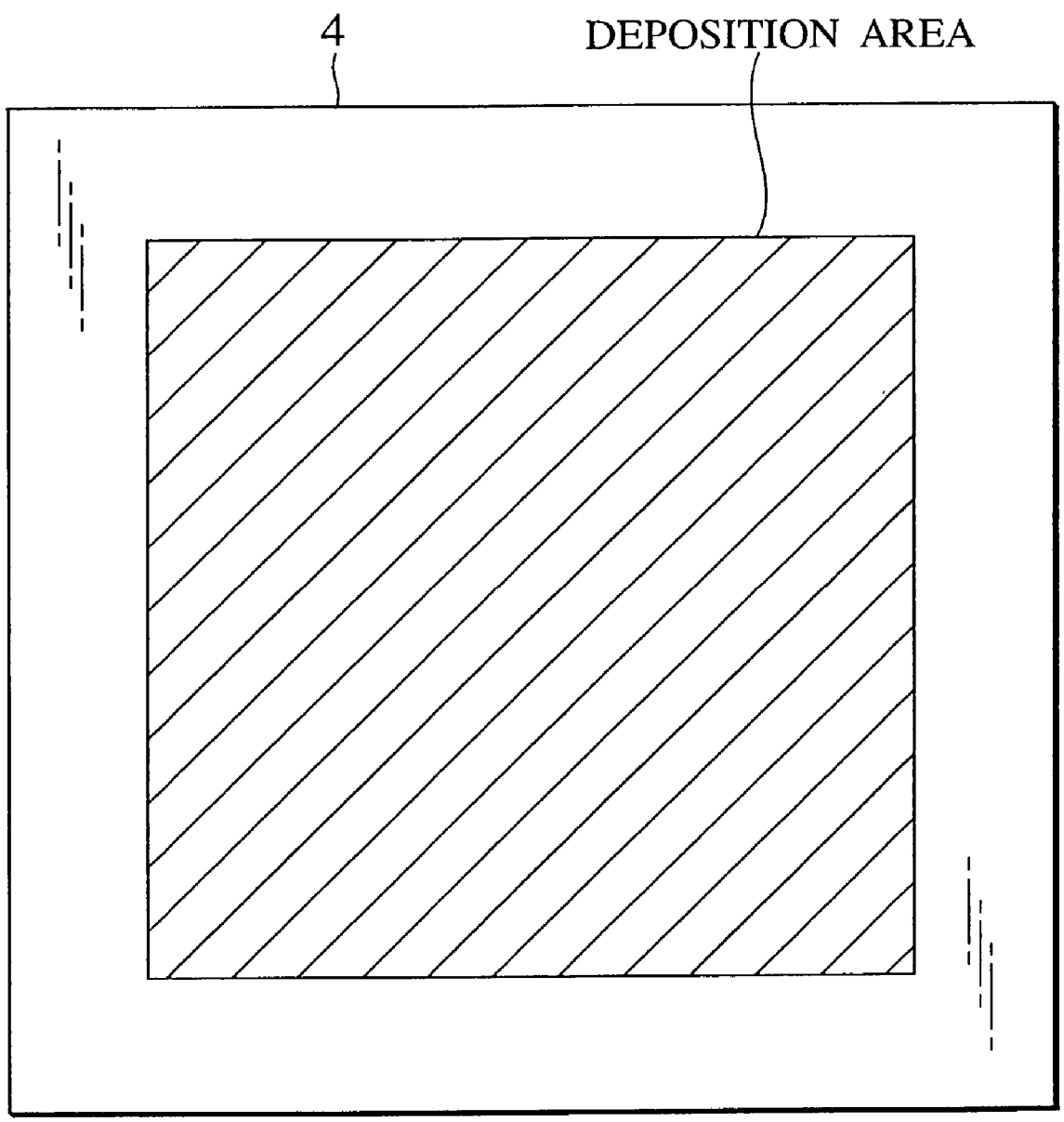
FIG. 9 is a plan view of the substrate used in the embodiment of the present invention.

At this time, an external fringe portion of the square-shaped silicon substrate 4 accommodated in a substrate holder of the apparatus was covered with a mask made of inconel, so that the electrode layer and the solid electrolyte layer were not formed in a peripheral portion of the substrate 4. Thus, as shown in FIG. 9, a film formation area was regulated within a 4 cm square in the square-shaped substrate 4. Hereinafter, each cell plate (the first and second cell plates 6A and 6B) was manufactured by use of this Si substrate.

2) Manufacture of Cell Plate 6B

A nickel oxide film having a thickness of about 5000 Å was formed on the foregoing silicon substrate as the fuel electrode layer by use of a magnetron sputter. A temperature of the substrate in forming the film was controlled to 700° C. by use of a radiation heater. As a target for sputtering, metallic nickel was used.

Next, the substrate temperature was lowered to 600° C., and by use of a sintered target made of 10 mol % yttria doped stabilization zirconia (hereinafter simply referred to as "10YSZ"), a 10YSZ thin film having a thickness of about 2 μm was formed as the solid electrolyte layer on the nickel oxide film.

Moreover, the substrate temperature was lowered to 500° C., and by use of a sintered target of strontium doped lantern/manganese composite oxide (LSM) a polycrystalline LSM film having a thickness of about 3000 Å was formed as the air electrode layer. In the above described manner, the nickel oxide film, the 10YSZ film and the polycrystalline LSM film were sequentially formed on the upper surface of the silicon substrate.

Next, a phosphosilicate glass (PSG) having a thickness of about 5000 Å was formed on the upper and lower surfaces of the substrate by use of a normal pressure CVD method. Subsequently, on the lower surface of the silicon substrate, that is, the back surface opposite to the surface where the 10YSZ film and the like are layered, a resist pattern corresponding to the pattern shown in FIG. 5A was transferred onto the PSG film by use of a photolithography method. The portions of the PSG film which exist in the areas corresponding to the opening portions 41 and the grooves 42 shown in FIG. 5A were removed by use of hydrofluoric acid based etchant.

After removing the photoresist by ashing, the substrate was dipped in water-containing hydrazine liquid of about 60° C. for about eight hours by use of the remaining PSG film as an etching mask, and then anisotropic etching was performed. Since the anisotropic etching was used, etching progressed along the (111) plane of the substrate. Accordingly, an etching depth was adjusted by an etching pattern width. Specifically, the groove was formed in such a manner that an etching pattern width was made to be narrower, and the etching was stopped when the substrate was etched to a certain depth. In the areas where the etching pattern width is large, the etching further progressed, and the opening portions were formed in the substrate. The laminated thin film previously formed remained in the opening portion of the substrate as an independence film, thus obtaining a diaphragm structure.

Subsequently, the silicon substrate was dipped in hydrofluoric acid series etching liquid, and the remaining PSG film was removed. Thereafter, the substrate temperature was elevated to 500° C. by use of a radiation heater, and then a nickel oxide film having a thickness of about 3000 Å was formed on the lower surface of the substrate, where the laminated film was not formed, by RF sputtering by use of the sintered target of LSM, thus forming the fuel electrode layer. This fuel electrode layer was formed along the grooves and the opening portions which were formed in the substrate, and came to have the opening shape with a groove. Thus, the cell plate 6B shown in FIG. 8A was obtained.

3) Manufacture of Cell Plate 6A

The substrate temperature was elevated to 700° C. by use of a radiation heater, and then a polycrystalline LSM film (air electrode film) having a thickness of about 5000 Å was formed on the silicon substrate by a magnetron sputter by use of a sintered target of LSM.

Next, the substrate temperature was lowered to 600° C., a 10YSZ thin film (solid electrolyte layer) having a thickness of about 2 μm was formed on the LSM film by use of a sintered target made of 10 mol % yttria doped stabilization zirconia (10YSZ).

Subsequently, the substrate temperature was lowered to 500° C., and a nickel oxide film (fuel electrode layer) having a thickness of about 3000 Å was formed by use of a metallic nickel target. In such a manner described above, the polycrystalline LSM film, the 10YSZ film and the nickel oxide film were sequentially formed on the upper surface of the silicon substrate.

Next, a PSG film having a thickness of about 5000 Å was formed on the upper and lower surfaces of the substrate by use of a atmospheric pressure CVD method. Subsequently, on the lower surface of the silicon substrate, that is, the back surface opposite to the surface where the 10YSZ film and the like are formed, a resist pattern corresponding to the pattern shown in FIG. 5A was transferred onto the PSG film by use of a photolithography method. The portions of the PSG film which exist in the areas corresponding to the opening portions 41 and the grooves 42 shown in FIG. 5A were removed by use of hydrofluoric acid series etchant.

After removing the photoresist by ashing, anisotropic etching was performed for the silicon substrate by use of the remaining PSG film as an etching mask under the same conditions as those for the cell plate 6B. The opening portions and the grooves were formed in the substrate.

Thereafter, the PSG film was removed, and on the lower surface of the substrate, a polycrystalline LSM film (air electrode layer) having a thickness of about 3000 Å was formed along the opening portions and the grooves by use of a magnetron sputter. Noted that a temperature of the substrate in forming the film was set to 500° C. and a sintered LSM was used as the sputter target. Thus, the cell plate 6B shown in FIG. 8A was obtained.

4) Stacking of Cell Plates and Manufacture of Fuel Cell Stack

Slurry of the LSM air electrode material which is the same as the air electrode material was coated onto the air electrode layer of the cell plate 6B having a flat plane according to the foregoing procedures. Subsequently, slurry-of the nickel oxide fuel electrode material which is the same as the fuel electrode material of the cell plate 6A was coated onto the fuel electrode of the cell plate 6A having a flat plane.

Next, as shown in FIG. 8C, the cell plates were alternately stacked upon one another, and sintered collectively at a temperature of 600° C. in a sintering furnace. Thus, the fuel cell stack was obtained.

5) Performance Evaluation

For the fuel cell stack in which two cell plates 6B and one cell plate 6A were stacked, its performance was evaluated. This fuel cell stack was set up in an electric furnace, and then pure hydrogen was allowed to flow through the fuel gas flow path and pure oxygen was allowed to flow through the oxygen flow path. Power generation test was conducted at a temperature of 700° C. As a result, open electromotive force of 1.05 V and the maximum output of 0.45 W/cm$^2$ were obtained.

The entire contents of Japanese Patent Application P2000-360563 (filed on Nov. 28, 2000) are incorporated herein by reference. Although the inventions have been described above by reference to certain embodiments of the inventions, the inventions are not limited to the embodiments described above. Modifications and variations of the embodiments described above will occur to those skilled in the art, in light of the above teachings.

The scope of the inventions is defined with reference to the following claims.

INDUSTRIAL APPLICABILITY

The solid oxide fuel cell stack of the present invention can be used as a small-sized power generator, and also as a power source of a moving body such as various portable equipment, automobiles and ships.

What is claimed is:

1. A solid oxide fuel cell stack, comprising:
   (1) a first cell plate provided with:
   a substrate having a plurality of opening portions;
   a groove formed in a lower surface of the substrate, the groove extending through the plurality of opening portions;
   a solid electrolyte layer formed on an upper surface of the substrate;
   a fuel electrode layer formed on the solid electrolyte layer; and
   an air electrode layer formed on the lower surface of the substrate, the air electrode layer having a shape in conformity with those of the plurality of opening portions and the groove of the substrate, and
   (2) a second cell plate provided with:
   a substrate having a plurality of opening portions;
   a groove formed in a lower surface of the substrate, the groove extending through the plurality of opening portions;
   a solid electrolyte layer formed on an upper surface of the substrate;
   an air electrode layer formed on the solid electrolyte layer; and
   a fuel electrode layer formed on the lower surface of the substrate, the fuel electrode having a shape in conformity with those of the plurality of opening portions and the groove of the substrate, and
   (3) wherein the first cell plate and second cell plate are stacked in such a manner that either of a pair of the air electrode layer of the first cell plate and the air electrode layer of the second cell plate or that of the fuel electrode layer of the first cell plate and the fuel electrode layer of the second cell plate face each other.

2. The solid oxide fuel cell stack according to claim 1, further comprising a third cell plate provided with:
   a substrate having a plurality of openings;
   a groove formed in a lower surface of the substrate, the groove extending through the plurality of opening portions;
   a solid electrolyte layer formed on an upper surface of the substrate;
   a fuel electrode layer formed on the solid electrolyte layer;
   an air electrode layer formed on the lower surface of the substrate,
   wherein the first cell plate, the second cell plate and the third cell plate are stacked in sequential order such that an air gas flow path is defined in cooperation with the air electrode layer of the first cell plate and that of the second cell plate and a fuel gas flow path is defined in cooperation with the fuel electrode layer of the second cell plate and that of the third cell plate.

3. The solid oxide fuel cell stack according to claim 1, wherein
   the first cell plate further comprises an additional air electrode layer between the upper surface of the substrate and the solid electrolyte layer, the additional air electrode layer being formed and covering the opening portions, and
   the second cell plate further comprises an additional fuel electrode layer between the upper surface of the substrate and the solid electrolyte layer, the additional fuel electrode layer being formed and covering the opening portions.

4. The solid oxide fuel cell stack according to claim 1, wherein
   the first cell plate further comprises an insulating layer between the upper surface of the substrate and the solid electrolyte layer, and
   the second cell plate further comprises an insulating layer between the upper surface of the substrate and the solid electrolyte layer.

5. The solid oxide fuel cell stack according to claim 1 wherein
   the first cell plate further comprises a stress absorbing layer between the upper surface of the substrate and the solid electrolyte layer, and
   the second cell plate further comprises a stress absorbing layer between the upper surface of the substrate and the solid electrolyte layer.

6. The solid oxide fuel cell stack according to claim 1, further comprising:
   a junction layer between the fuel electrode layer of the first cell plate and a fuel electrode layer formed along the opening portions of the second cell plate and the groove of the second cell plate adjacent to the first cell plate, the junction layer being formed by use of a slurry containing the same material as the fuel electrode layer; and
   a junction layer between the air electrode layer formed along the opening portions of the first cell plate and the groove and the air electrode layer of the second cell plate adjacent to the first cell plate, the junction layer being formed by use of a slurry containing the same material as the air electrode layer,
   wherein the junction layers are sintered integrally with the electrode layers adjacent thereto.

7. The solid oxide fuel cell stack according to claim 2, wherein
   the first cell plate and second cell plate are arranged so that a direction along which fuel gas flows in the fuel gas path and a direction along which air flows in the air gas flow path intersect one another at an approximately right angle.

8. The solid oxide fuel cell stack according to claim 1, wherein
   the substrate shows an electrical conductivity at a temperature at which the solid oxide fuel cell stack operates.

9. The solid oxide fuel cell stack according to claim 8, wherein
   the substrate is a silicon substrate.

10. The solid oxide fuel cell stack according to claim 1, wherein
   the solid electrolyte layer, the air electrode layer and the fuel electrode layer of the first cell plate and the solid electrolyte layer, the air electrode layer and the fuel electrode layer of the second cell plate comprise a thin film formed by use of any of a PYD method, a CVD method or a plating method.

11. A method of manufacturing a solid oxide fuel cell stack comprising:
(1) preparing a first cell plate comprising:
a substrate having a plurality of opening portions;
a groove formed in a lower surface of the substrate, the groove extending through the plurality of opening portions;
a solid electrolyte layer formed on an upper surface of the substrate;
a fuel electrode layer formed on the solid electrolyte layer; and
an air electrode layer formed on a lower surface of the substrate, the air electrode having a shape in conformity with those of the plurality of opening portions and the groove of the substrate; and
(2) preparing a second cell plate comprising:
a substrate having a plurality of opening portions;
a groove formed in a lower surface of the substrate, the grove extending through the plurality of opening portions;
a solid electrolyte layer formed on an upper surface of the substrate;
an air electrode layer formed on the solid electrolyte layer; and
a fuel electrode layer formed on a lower surface of the substrate, the fuel electrode having a shape in conformity with those of the plurality of opening portions and the groove of the substrate,
(3) stacking the first cell plate and the second cell plate in such a manner that either of a pair of the air electrode layer of the first cell plate and the air electrode of the second cell plate or that of the fuel electrode layer of the first cell plate and the fuel electrode layer of the second cell plate face each other; and
(4) collectively sintering the stacked first cell plate and the second cell plate.

12. The method of manufacturing the fuel cell stack according to claim 11 further comprising:
coating a slurry onto the fuel electrode layer of the first cell plate, the slurry containing the same material as the fuel electrode layer, before stacking the first and second cell plates one to another; and
coating a slurry onto the air electrode layer of the second cell plate, the slurry containing the same material as the air electrode layer.

13. The method of manufacturing the fuel cell stack according to claim 12, wherein
(1) the first cell plate is prepared by the steps comprising:
forming the solid electrolyte layer on the substrate;
forming the fuel electrode layer on the solid electrolyte layer;
forming a mask layer on the lower surface of the substrate;
etching the substrate from the lower surface thereof by use of the mask layer as an etching mask, thus forming the groove extending through the plurality of opening portions; and
forming the air electrode layer on the lower surface of the substrate so as to extend along the surfaces of the opening portions and the groove, and
(2) preparing the second cell plate by the steps comprising:
forming the solid electrolyte on the substrate;
forming the air electrode layer on the solid electrolyte layer;
forming a mask layer on the lower surface of the substrate;
etching the substrate from the lower surface thereof by use of the mask layer as an etching mask, thus forming the groove extending through the plurality of opening portions; and
forming the fuel electrode layer on the lower surface of the substrate so as to extend along the surfaces of the opening portions and the surface of the groove.

14. The method of manufacturing the fuel cell stack according to claim 13, wherein
(1) the first cell plate is prepared by the steps comprising:
forming another air electrode layer on the upper surface of the substrate, before the formation of the solid electrolyte layer, and
(2) preparing the second cell plate by the steps comprising:
forming another fuel electrode layer on the upper surface of the substrate, before the formation of the solid electrode layer.

15. The method of manufacturing the cell stack according to claim 13, wherein
the solid electrolyte layer, the air electrode layer and the fuel electrode layer of the first cell plate and the solid electrolyte layer, the air electrode layer and the fuel electrode layer of the second cell plate are formed by use of any of a PVD method, a CVD method or a plating method.

16. The method of manufacturing the fuel cell stack according to claim 11, wherein
a silicon substrate is used as the substrate of the first and second cell plates.

17. The method of manufacturing the fuel cell stack according to claim 16, wherein
the opening portions of the first and second cell plates and the grooves thereof are formed by use of anisotropic etching.

18. The method of manufacturing the fuel cell stack according to claim 17, wherein
the groove has a width which is narrower than that of the opening portions.

* * * * *